May 2, 1933. F. O. SNOW, JR 1,906,428
CONTROLLING MECHANISM FOR TRACTORS
Filed Aug. 16, 1928 5 Sheets-Sheet 4

Inventor:
Frederick O. Snow, Jr.
by Emery, Booth, Janney & Varney
Attys.

May 2, 1933.   F. O. SNOW, JR   1,906,428
CONTROLLING MECHANISM FOR TRACTORS
Filed Aug. 16, 1928   5 Sheets-Sheet 5

Inventor:
Frederick O. Snow Jr.

Patented May 2, 1933

1,906,428

UNITED STATES PATENT OFFICE

FREDERICK O. SNOW, JR., OF WINCHESTER, MASSACHUSETTS, ASSIGNOR TO MEAD-MORRISON MANUFACTURING COMPANY, OF BOSTON, MASSACHUSETTS, A CORPORATION OF MAINE

CONTROLLING MECHANISM FOR TRACTORS

Application filed August 16, 1928. Serial No. 300,113.

This invention aims to provide simple and effective means for controlling the operations of tractors.

In the accompanying drawings, I have shown merely for illustrative purposes one embodiment of my invention wherein.

The particular embodiment of this invention selected for purposes of illustration, and shown in the drawings, comprises principally the controlling devices for a tractor of the track laying type, whereby said tractor may be steered and the brakes be properly applied so as to assist in the steering of the tractor and in stopping the same.

Figure 1:
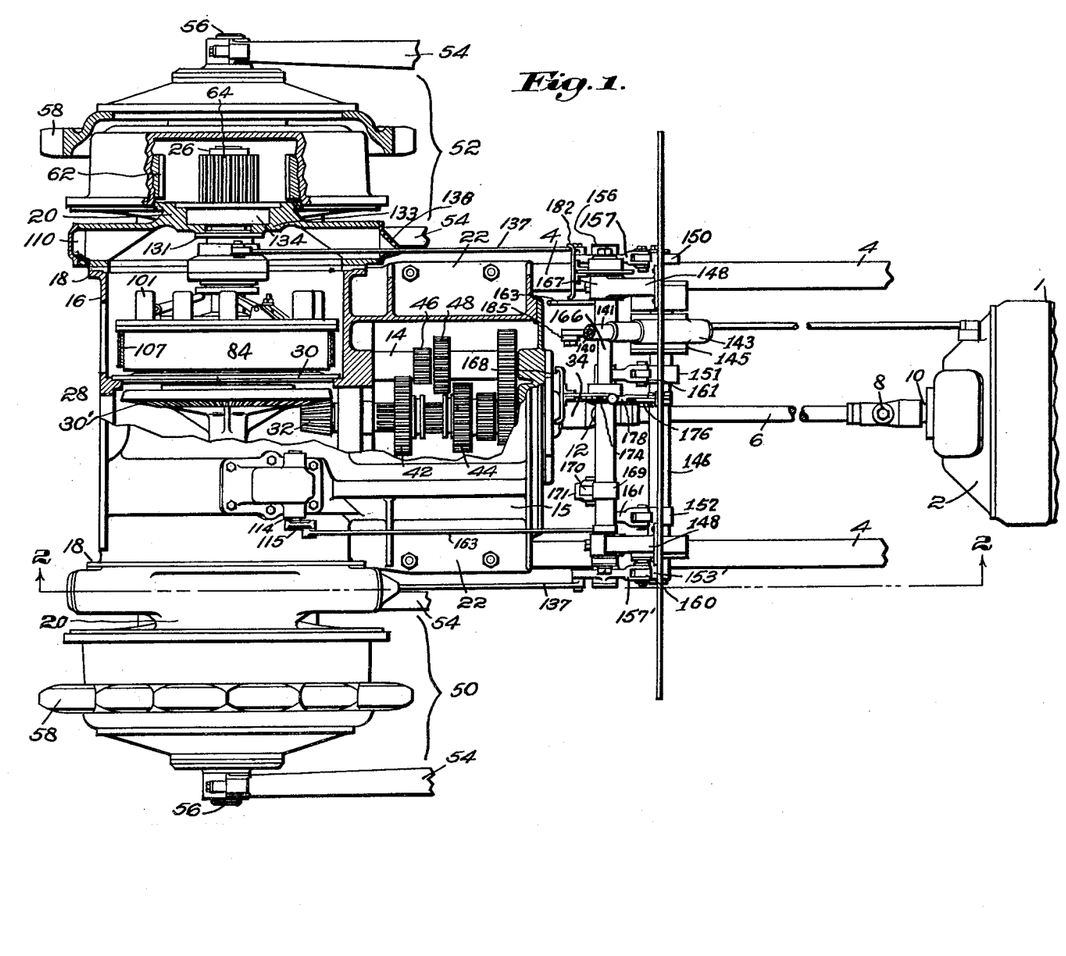
Fig. 1 is a plan view of the tractor chassis with portions of the rear axle housing and transmission casing broken away, and shown in section to more clearly illustrate the mechanism therein. The forepart of the main frame and the engine housing and the forward portions of the tractor frames are also broken away to simplify the drawings.
Figure 2:
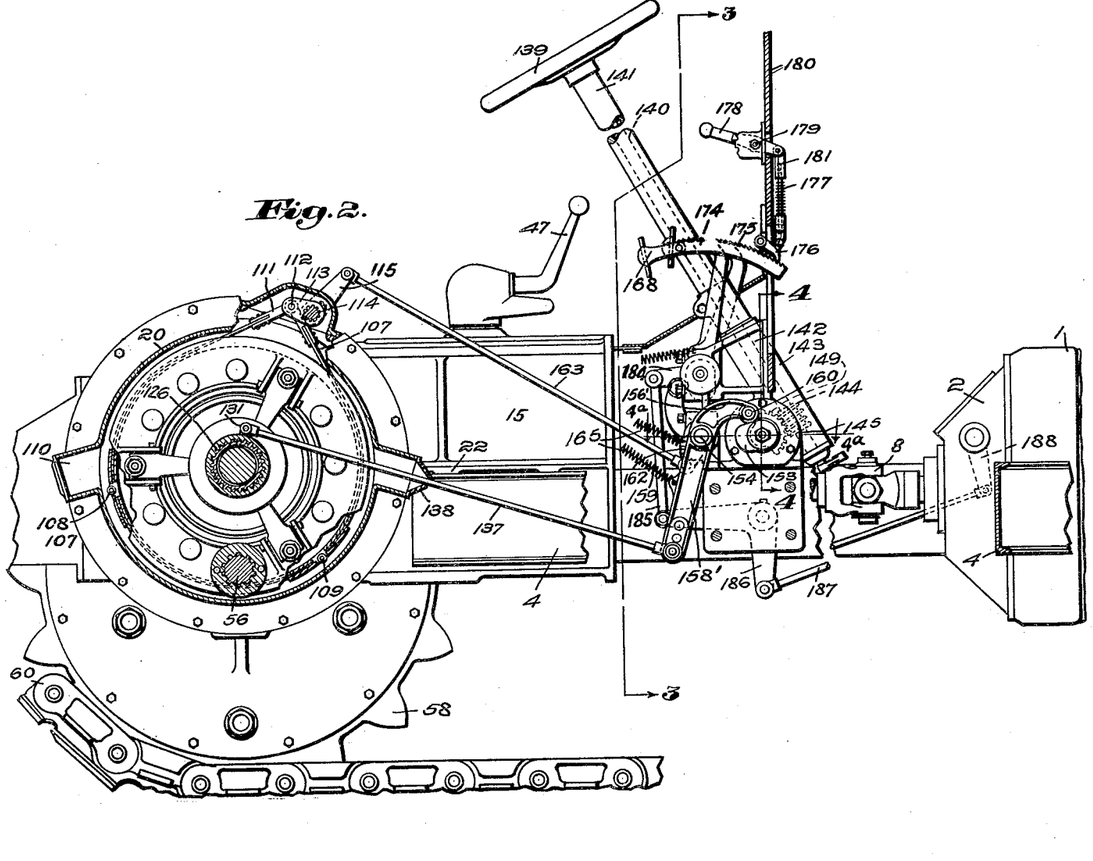
Fig. 2 is a part side elevation and part section taken substantially on the line 2—2 of Fig. 1.

In the drawings, referring particularly to Figs. 1 and 2, the power unit of the tractor is represented in part at 1, which part represents the rear end of the engine casing and to which the master clutch housing 2 is attached. Extending rearwardly from the power unit 1 are side frame members 4 and mounted between the latter members is a drive shaft 6 connected herein at its forward end by a universal joint 8 with a clutch shaft 10, and at its rear end by a second universal joint 12 with transmission gearing represented generally by the reference character 14, and contained within the transmission housing 15. The transmission housing is desirably integral with the central part 16 of a rear axle housing. The portion 16 of said rear axle housing has transverse openings at opposite sides surrounded by flanges 18, to which are secured end housings 20.

The transmission housing 16 is provided with laterally extending ledges 22, which rest upon, and are secured to, the rear ends of the side frames 4, forming as it were, a rigid frame construction from the rear axle housing forwardly to the engine housing.

Enclosed within the rear axle housing comprising the casing section 16 is a rear axle formed in three aligned sections including a middle section 24 (see Fig. 5) and right and left end sections 26. The central section 24 is journalled to rotate in suitable bearings 28 arranged at each end of said central section in partitions 30. Extending across the section 16 of said rear axle housing, splined or otherwise secured to said central shaft section 24 is a driven member, herein a beveled gear 30', arranged to mesh with a driving beveled pinion 32, secured to the power shaft 34 (see Fig. 1) of the transmission gearing through which said driving pinion receives its power from the power unit 1. The central driving section 24 of said axle extends through the partitions 30 (see Fig. 5), containing the bearings 28 and the protruding ends thereof are desirably fluted at 36, while beyond these fluted sections said shaft ends are reduced at 38 and engage suitable bearings 40 arranged within the adjacent end of the end shaft sections 26. As shown most clearly in Fig. 5, the reduced end 38 is shown extending into a recess 39 of the shaft section 26, wherein is mounted the bearing 40, which provides support for the inner end of said shaft section 26.

The shaft 34 hereinbefore referred to as the power shaft of the transmission gearing carries at least two, 42 and 44 (see Fig. 1), shiftable gears, which are adapted to be shifted into mesh with other gears herein gears 46 and 48, by a gear shift lever 47 (see Fig. 2)

operated in a well-known manner to vary the speed or reverse the rotation of the shaft 34 with respect to the driving shaft 6 from the motor, providing the usual variable speeds from the motor to the traction members.

The traction members through which straightaway and turning movements of the tractor are effected, are in the present example of the track laying type consisting of two track laying structures 50 and 52 (see Fig. 1).

The particular type of track laying tractor disclosed herein as embodying the invention, is so well-known that only certain parts have been shown herein, for example, the track laying structures embody traction frames 54, pivoted at their rear ends to the tractor frame structure upon laterally projecting studs 56. The traction frames 54 are spaced at said rear ends to receive therebetween a sprocket 58, about which the usual track chain runs, the latter being shown in part at 60, Fig. 2. Rotatably mounted upon the stud 56 to rotate with said sprocket is an internal gear 62. The gear 62 meshes with a pinion 64 secured to the end of the shaft section 26, which imparts movement to the track chains, and thereby impels the tractor.

Figure 5:
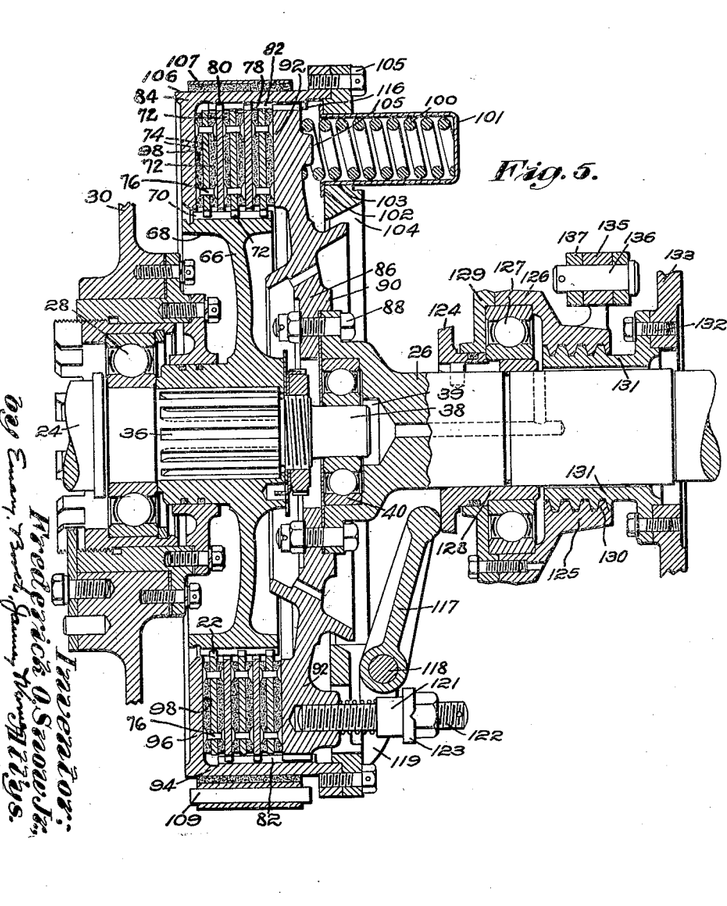
Fig. 5 is a vertical axial section through one of the steering clutches.

The steering of the tractor is effected by moving one of the traction chains faster than the other or more correctly speaking, by disconnecting one of said traction mechanisms from the driving instrumentalities of the tractor, and applying a brake to that disconnected member, permitting the connected traction member upon the opposite side to turn the tractor substantially in a circle about a point in the stationary traction member. To this end, friction clutches are interposed between the power shaft 34 and each pinion 64, and the type of clutch employed in this connection is best shown in Fig. 5, and comprises a driving clutch member 66 mounted upon and keyed to the fluted end 36 of the driving section 24 of the rear axle.

The driving member 66 is provided with a cylindrical rim 68 having a series of peripheral keys 70 extending in a direction parallel with the axis of the shaft 24. Encircling said rim 68 is a series of driving clutch rings 72 having notches in their inner peripheries to receive the keys 70, to cause said rings to rotate with the driving clutch member but permitting axial sliding movement of said rings. Each ring 72 is desirably provided upon opposite faces with friction pads 74 of any suitable material and securely fastened to said rings 72 by means such as rivets 76.

Interposed between the rings 72 of the driving clutch member are clutch rings 78, the latter rings having a series of teeth 80 in their outer peripheries to engage corresponding ribs 82 provided upon the driven member of said clutch, whereby to transmit the movements of the driving member to said driven member.

The driven member of the clutch shown herein includes a floating ring 84 rotating in unison with a radially arranged flange-like member 86 herein secured by bolts 88 to a flange 90 extending laterally from the inner end of the shaft section 26.

The marginal portion of the rim 86 indicated at 92 in Fig. 5 constitutes a pressure rim to act against the endmost clutch ring and to assist in providing the necessary driving pressure upon said clutch rings. The floating ring 84 is desirably constructed in two parts, one of which parts comprises a cylindrical drum 94 (see lower part of Fig. 5) upon one end of which is formed an annular ring 96 having a face 98, which is arranged to engage the clutch ring at the opposite end of the series from that engaged by the pressure rim 92.

By forcing the ring 98 and the rim 92, one toward the other under sufficient pressure, the adjacent faces of the clutch rings 72 and 78 will be forced into contact with each other sufficiently to transmit motion from the driving member 66 of the clutch to the driven member carried by the shaft 26, thereby imparting movement to the pinion 64. The means for maintaining the above-mentioned frictional contact between said rings herein comprises a series of springs 100 which are so arranged that they constantly urge the pressure rim 92 and the pressure ring 98 toward each other. To distribute this pressure evenly, the springs 100 are desirably of relatively small power and arranged in circular series about the axis of the clutch, and in the present example each is contained within a cup-like holder 101 which latter is closed at one end and provided with an annular external flange 102 at its opposite end. The cup member 101 is inserted through an opening 103 formed in a ring 104 secured by screws 105 to one edge of the drum 94, and constitutes a part of the floating ring 84. The springs 100 seat against the closed ends of the spring cups 101 and against the adjacent face of the pressure rim 92, and are held in proper position by projecting nubs 105 formed upon said pressure rim.

The outer periphery of the drum 94 desirably constitutes a braking surface 106 which is embraced by a brake band 107. The latter is formed in sections, preferably three, (see Fig. 2) pivoted together at 108 and 109 to facilitate the removal of said brake bands through peripheral openings 110 in the rear axle housing. The ends of each band are provided with eyes 111 which are pivotally connected by a pin 112 to a rocker arm 113. The rocker arm 113 is adjustably secured to a rock shaft 114 arranged to rock in a part of the rear axle housing. A protruding end of the rock shaft stud 114 has secured thereto an arm 115 to which may be connected instrumentalities hereinafter explained for rocking said rocker arm 113 to apply the brake to the rim of the floating ring 84.

The pressure rim 92 is provided with a series of notches or teeth 116 (see Fig. 5) which interlock with the radial ribs 82 to prevent relative rotary movement between the floating ring 84 and said pressure rim 92, although these interlocking elements are arranged to permit relative, axial movement, so that when the brake band 107 is tightened, the traction member controlled thereby will be retarded or stopped, according to the degree of pressure applied by the brake.

Figure 6:
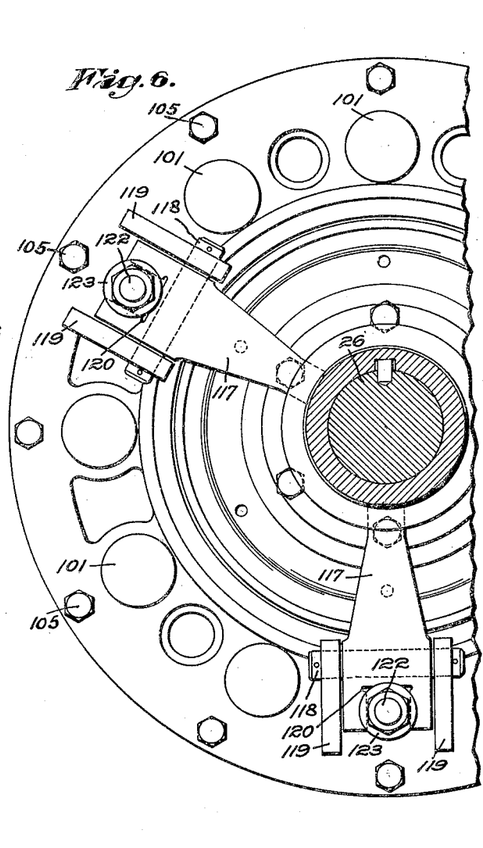
Fig. 6 is an end elevation of the clutch as viewed from the right of Fig. 5, portions thereof being broken away to save space in the drawings.

To release the pressure upon the pressure rim 92 and the pressure ring 98 means are herein provided for compressing the springs 100, which means preferably comprises a series of clutch releasing levers 117, herein three in number, each of which is pivotally mounted upon a pin 118 carried by a pair of ears 119 projecting laterally from the outer face of the ring 104 on the floating ring 84. One end of each lever 117 is forked at 120 (see Fig. 6) to straddle a collar 121 having screw-threaded engagement with a stud 122 secured in the pressure rim 92. The collar 121 has a flange 123 for engagement with the forked end 120 of the associated lever 117. The collar 121 is adjustably mounted upon the stud 122 so that the pressure of the spring 100 may be varied. The levers 117 project radially toward the shaft 26. Slidably mounted upon the shaft 26 is a collar 124 arranged to engage the inner ends of all of said levers 117 in such a manner that when said collar is moved axially of said shaft in one direction, the levers 117 will be actuated simultaneously to compress all the springs 100 and thereby throw out the clutch, permitting the traction member controlled by this clutch either to stop or to move at a greatly reduced speed due to the slipping of said clutch. Any appropriate means may be provided for moving the collar 124 for the purpose of throwing out the clutch, but in the present example, I provide means including a rotatably and axially movable clutch operating member 125 presenting a ring 126 mounted upon a bearing unit 127 surrounding a hub 128 of the collar 124. A detachable ring 129 is secured to the ring 126 and rotatably engages a portion of the hub 128 and forms an oil tight joint, and with the ring 126 entirely encloses the bearing unit 127. A portion of the ring 126 is internally threaded at 130 to engage corresponding steep pitched threads on the inner end of a stationary sleeve 131, through which the shaft 26 extends. The sleeve 131 is desirably secured by screws 132 to a portion 133 of the rear axle housing in close proximity to the ends of said housing wherein is mounted a bearing member 134 (see Fig. 1) supporting the outer end of the shaft 26 close to the pinion 64 (see Fig. 1). The bearing units 134 and 40 (see Fig. 5) constitute the sole supports for the end sections 26 of said driving shaft. The ring 126 has an eye 135 connected by a pin 136 with the forked end of a rod 137, said rod receiving its movement from track controlling means hereinafter described, said rod extending from the interior of the rear axle housing section 20 outwardly through a flexible gland 138, best shown in Figs. 1 and 2, which prevents dust and dirt from entering the clutch chamber.

Reciprocation of the rod 137 through the gland 138 imparts a rocking movement to the clutch-operating member 125 and its ring 126, and because of the screw threads 130, said member will be moved axially of the shaft 26 a distance sufficient to cause the collar 124 to rock the clutch releasing levers 117 thereby moving the pressure rim outwardly in opposition to the resistance of the springs 100, and resulting in the throwing out of the clutch at one side or the other of the vehicle and the stopping of the track member whose clutch has been disconnected.

As hereinbefore stated, the steering of the tractor is effected by stopping or slowing up the traction member at one side thereof and permitting the other traction member to proceed and so turn the vehicle about a point in the stationary traction member as a pivot. It is desirable, however, that only one steering clutch be disconnected at one time,—stopping of the tractor being accomplished in the usual manner by first throwing out the master clutch and then in shifting the transmission gears into neutral. The only time either steering clutch is disengaged is when it is desired to turn the tractor one way or the other. In straightaway travel, both clutches remain engaged.

For convenience of operation, instrumentalities are provided whereby the disengagement of one or the other of the steering clutches is accomplished by a common actuating member, herein a steering wheel 139 (see Fig. 2). This steering wheel is of the usual automobile steering wheel type and is secured to the upper end of a shaft 140 rotatably mounted in a steering column 141. The steering column is slightly inclined rearwardly for convenience and terminates at its lower end in a bracket 142 (see Fig. 3) carried by the main frame 4. This bracket has at its lower end a housing 143 containing a worm 144 (see Fig. 2) which is secured to the lower end of the shaft 140, and integral with said housing 143 is a cylindrical housing 145 (see Fig. 4) surrounding a shaft 146 which extends transversely of the tractor frame 4, and has bearing units 147 near opposite ends of said shaft and mounted in brackets 148 secured to said frame members 4. Within the housing 145 and secured to the shaft 146 is a worm gear segment 149 herein keyed or otherwise secured to said shaft 146.

The steering wheel shaft 140 is permitted to rotate within the steering column, but is prevented by suitable end thrust bearings from moving axially therein. Consequently upon rotation of the steering wheel in one direction or the other, the worm 144 will impart a rocking movement through the worm gear segement 149 to the shaft 146.

The shaft 146 (see Fig. 4) is provided with a series of cams herein four, indicated respectively at 150, 151, 152 and 153. These cams are fixed to the shaft 146 to rotate therewith, and are desirably similar in shape. Cams 150 and 153 are located at opposite ends of said shaft, and herein are the cams for operating the steering clutches, while the cams 151 and 152 are located between the frames 4 and are for applying the brakes of the clutches operated by the cams 150 and 153 respectively. A second transverse shaft 154 (see Fig. 3) is arranged parallel with the shaft 146 and is provided with bearings 155 carried by the brackets 148. Mounted upon the end of the shaft 154 adjacent to the cam 150 is a rocker lever 156 (see Fig. 3) having an arm 157 carrying a cam follower arranged to roll upon the periphery of the cam 150. Another arm 158 of said lever is connected with the forward end of one of the rods 137 hereinbefore referred to. A spring 159 acts upon the lever 158 to retract the rod 137 and thereby maintain the collar 124 to the right in Fig. 5, leaving the springs 100 free to act in maintaining pressure upon the clutch rings 72 and 78.

Figure 3:
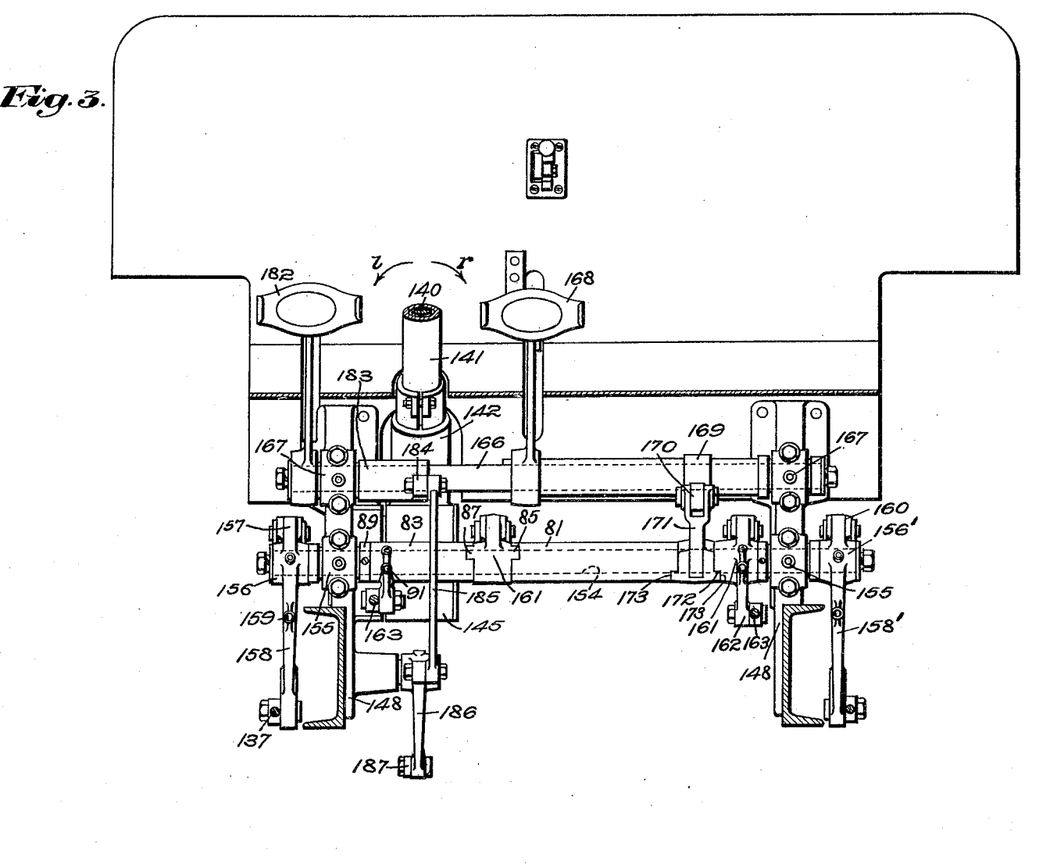
Fig. 3 is a transverse section through the frame of the tractor taken substantially on the line 3—3, and looking toward the front.
Figures 4, 4A:
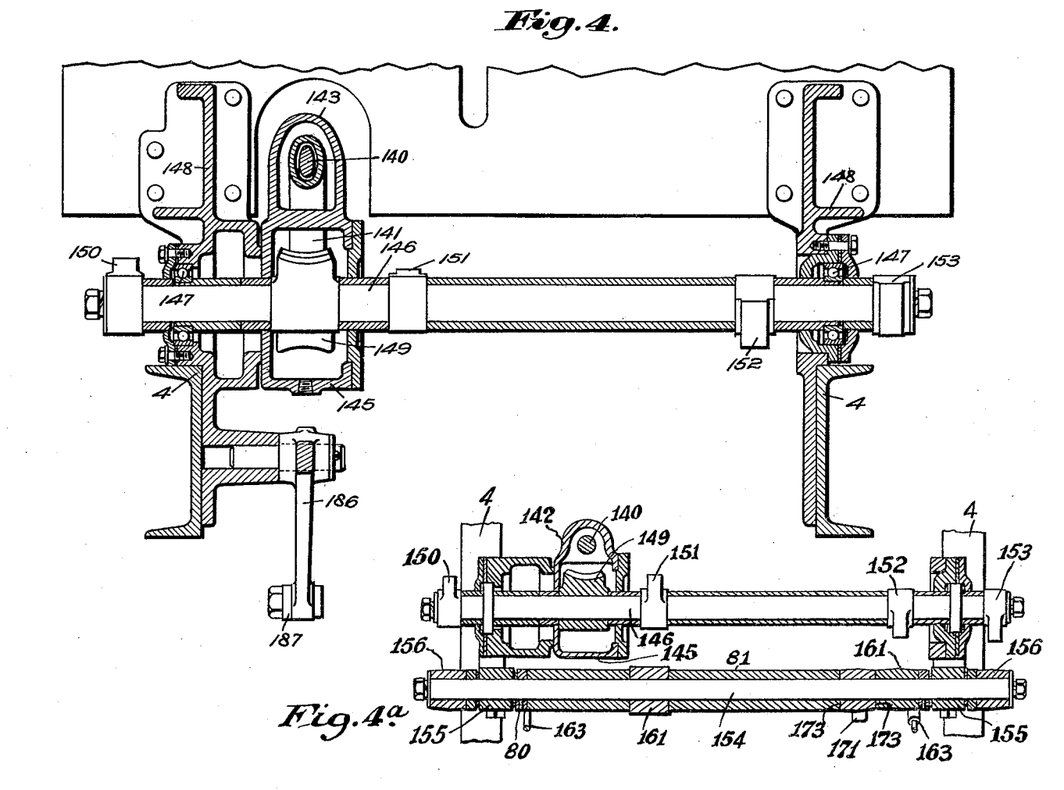
Fig. 4 is a detail transverse section taken longitudinally of the cam shaft and substantially on the line 4—4 of Fig. 2.
Fig. 4a is a horizontal, sectional view on line 4a—4a of Fig. 2.

Also mounted upon the right hand end of the shaft 154, as viewed in Fig. 3 (see also Figs. 1 and 4), but adjacent to the cam 153′, is a second rocker lever 156′ having an arm 158′ similar to the lever 158, hereinbefore mentioned, upon the opposite end of said shaft 154. This arm 158′ also has a cam follower 160 (see Figs. 1 and 2) which engages the periphery of said cam 153′ and effects the rocking of said lever 158′ through its link 137 shown most clearly in Fig. 2 to provide a rotary and axial movement of the ring 126 to cause the collar 124 to rock the clutch releasing levers 117 and throw out the clutch on that side of the tractor. Loosely mounted upon the shaft 154 adjacent the cams 151 and 152 respectively are cam levers 161 each carrying a cam follower to engage its respective cam. The cam lever for the cam 152 has an arm 162 pivotally connected with a brake actuating rod 163 (see Fig. 2). The rod 163 connects the lower end of its lever 162 with the arm 115 hereinbefore described as secured to the rock-shaft 114 and transmits motion from said cam 152, to the rock-shaft 114 to apply the brake connected therewith. Both of the cams 151 and 152 are open cams and operate their rocker levers 161 in one direction, viz., to apply the brakes, but as the cams turn to pass their followers, springs 165 act upon their respective levers to release their brakes. The various cams 150, 151, 152, and 153 are so placed upon the cam shaft 146 that when the shaft is in its intermediate position, the cam levers will be at rest, leaving both clutches thrown in and both brakes released, and while in these positions, the tractor if the power be applied through the master clutch, will travel in a straight line or as straight as the character of the terrain over which the tractor is travelling will permit.

The lever 161 upon which the cam 151 acts is slightly different in construction from the lever acted upon by the cam 152 in that it is loosely mounted upon the shaft 154 between the ends of two sleeves 81 and 83 (see Fig. 3) with which said lever is interlockingly engaged by clutch teeth 85 and 87 respectively, whereby any movement of said lever 161 will be imparted to said sleeves. The sleeve 83 at its left hand end (Fig. 3) engages a collar 89 secured to the shaft 154 which constantly maintains engagement between the tooth 87 and a corresponding notch in the adjacent end of said sleeve. Depending from the sleeve 83 is an arm 91 pivotally connected to one of the brake rods 163 whereby said cam 151 may apply its brake at the proper time.

The steering wheel, cams and means for operatively connecting said cams with their clutches and brakes are so arranged and positioned that by turning the steering wheel in one direction from its central position, for example, toward the left as indicated by the arrow 1, Fig. 3 that the cam 150 will actuate its cam lever and clutch to throw out the steering clutch upon the left hand side of the tractor and stop the movements of the track chain upon that side, or, if said steering wheel is moved to the right in the direction of the arrow r in Fig. 3, the cam 153 will act through its cam lever and connecting means to throw out the clutch for the right hand track chain, thus permitting that track chain to cease moving. It is apparent, however, that but one of these clutches will be disconnected at the same time, and a point in the disconnected track will serve as the pivot about which the connected and operating traction member will turn.

Set slightly behind the cam 150 upon the cam shaft 146 is the brake cam 151. Upon the movement of the steering wheel toward the left as previously stated, a distance sufficient to designate the clutch of the associated track, the brake for that clutch will, by a slight additional movement of the steering wheel in the same direction, be applied to the brake drum of the disengaged steering clutch, and thereby prevent further rotation of the driving sprocket of the disconnected traction chain. The cam 152 is likewise placed upon said shaft in the same relation with its clutch cam 153 so that by turning the steering wheel to the right beyond the point where the right hand steering clutch is disengaged, the brake for that side will also be applied, and further movement of the right hand track chain be prevented.

A slight lost motion between each clutch cam and its brake cam is provided so that slight additional movement of the cam shaft will not immediately operate to apply the brake, because on level ground, the brake need not be applied, but generally only in cases where the tractor is on an incline and has a tendency to travel without power, will it be necessary or desirable to apply the brake to the disconnected clutch to effect the steering operation.

In most if not all tractors and motor vehicles, it is desirable to provide means for stopping the tractor or for holding the same in its stationary position against inadvertent movement as when the tractor is stopped upon an incline, therefore, means are provided for operating the brakes independently of the brake cams 151 and 152, said means including a third transverse shaft 166 journalled to rock in suitable bearings 167 at opposite ends of said shaft in the brackets 148. This shaft 166 is a pedal shaft, and has secured thereto adjacent to the steering cam 141 a brake pedal 168. Also secured to the shaft 166 is a cam 169 engaged by a follower 170 carried by a lever 171 loosely mounted upon the shaft 154. The lever 171 is connected with the brake lever 161 on one side and the end of the sleeve 81 upon the other side of the clutch by a lost motion clutch device herein comprising shoulders 172 and 173 (see Fig. 3) whereby the depressing of the pedal 168 will move the cam 169 to rock the lever 171, and after a predetermined amount of lost motion between shoulders 172 and 173 will cause the brake rods 163 to act simultaneously to apply their respective brakes. The lost motion between the shoulders 172 and 173 is secured to a sleeve 183 sufficient to permit levers 161 and 91 to idle without affecting movement of the lever 171 when said levers 161 and 91 are operated by the cams 151 and 152. The foot pedal 168 is provided with a segmental ratchet 174 having teeth 175 to be engaged by a pawl 176 yieldingly held in contact with said teeth by a spring 177. A hand operating lever 178 pivoted at 179 to the dash 180 of the tractor within easy reach of the operator of the tractor, is connected by a rod 181 with the pawl 176 whereby the emergency brake pedal may be released when desired.

Also mounted upon the shaft 166 is a second pedal 182. This pedal being loosely pivoted upon said shaft, and extends through the bearing 187 to the opposite side of the latter, where it is provided with an arm 184. The lever 184 is connected by a link 185 with a rocker lever 186, which in turn is connected by a link 187 with the operating lever 188 of the master clutch contained in the housing 2.

The invention is not limited to the specific embodiment herein shown.

I claim:

1. In a tractor, a pair of steering clutches, means including a shaft for operating said clutches to effect steering of the tractor, a cam on said shaft for each clutch, a gear attached to said shaft, a steering wheel for operating said gear and incidentally to operate said shaft in opposite directions, a rocker lever operatively connecting each cam with one of said steering clutches, said cams being arranged on said shaft to shift but one of said clutches at a time, a brake for each of said clutches, a second pair of cams on said cam shaft, and a rocker arm interposed between each of said second cams and its associated brake to effect the applying of such brake following the throwing out of the associated clutch.

2. In a tractor, a pair of steering clutches, brakes for said clutches, means including a transverse shaft to operate said clutches and brakes to steer the tractor, a series of cams on said transverse shaft for respectively operating said clutches and brakes, means to rotate said shaft in opposite directions, cam levers operatively connecting certain of said cams with said clutches, means to operatively connect certain others of said cams with said brakes including a second transverse shaft arranged parallel with said transverse shaft, and cam levers rockably mounted upon said second transverse shaft and having cam followers engaging certain of said cams and operable thereby severally to apply their respective brakes.

3. In a tractor, a pair of steering clutches, brakes to cooperate with said clutches to augment the steering operations, means including a transverse shaft to operate said clutches and brakes to steer the tractor, cams secured to said transverse shaft for respectively operating said clutches and brakes, means to rotate said shaft in opposite directions, rocker levers operatively connecting certain of said cams with said clutches, means operatively to connect certain others of said cams with said brakes including a second transverse shaft arranged parallel with said transverse shaft, rocker levers rockably mounted upon said second transverse shaft and having cam followers engaging certain of said cams and operable thereby to severally apply their respective brakes, and a third transverse shaft arranged parallel with the other shafts, a pedal secured to said third shaft, a cam secured on said third shaft, a lever loosely mounted upon said second shaft provided with a cam follower engaging the last mentioned cam, and clutch means adapted upon the rocking of said lever in one direction to effect the simultaneous operation of said brake operating rocker levers.

4. In a tractor, a pair of steering clutches, brakes for said clutches, means to operate said clutches and brakes to steer the tractor, including a shaft, a series of cams secured to said shaft for respectively operating said clutches and brakes, means to rotate said shaft in opposite directions, rocker arms operatively connecting certain of said cams with said clutches, means to operatively connect certain others of said cams with said brakes including a second shaft arranged parallel with said shaft, levers rockably mounted upon said second shaft and having cam followers engaging certain of said cams and operable thereby to severally apply their respective brakes, and a third shaft arranged parallel with the other shafts, a pedal secured to said third shaft, a cam secured on said third shaft, a rocker lever loosely mounted upon said second shaft provided with a cam follower engaging the last mentioned cam, and clutch means arranged upon the rocking of said rocker lever in one direction to effect the simultaneous operation of said brake operating levers.

5. In a tractor, a pair of steering clutches, brakes for said clutches, means to operate said clutches and brakes to steer the tractor, including a shaft, a series of cams secured to said shaft for respectively operating said clutches and brakes, means to rotate said shaft in opposite directions, rocker arms operatively connecting certain of said cams with said clutches, means operatively to connect certain others of said cams with said brakes including a second shaft arranged parallel with said shaft, levers rockably mounted upon said second shaft and having cam followers engaging certain of said cams and operable thereby to severally apply their respective brakes, and a third shaft arranged parallel with the other shafts, a pedal on said third shaft, a cam on said third shaft, a lever loosely mounted upon said second shaft provided with a cam follower engaging the last mentioned cam, and means operably upon the rocking of said lever in one direction to effect the simultaneous application of both of said brakes.

6. In a tractor, the combination of a pair of steering clutches and a brake for each of said clutches, a rotatable cam shaft, a series of cams secured in different angular spaced positions on said cam shaft, a worm gear secured to said cam shaft, a steering wheel, a worm arranged to rotate with said steering wheel and to operate through said worm gear said cam shaft in opposite directions and connections between said cams and said clutches and brakes whereby operation of said steering wheel in one direction will release one of said steering clutches and apply its brake and operation of said steering wheel in the opposite direction will release the other steering clutch and apply its brake.

7. In a tractor, a pair of steering clutches, means including a shaft for operating said clutches to effect steering of the tractor, a cam for each clutch, a gear attached to said shaft, a steering wheel for operating said gear and incidentally to operate said shaft in opposite directions, operating means for connecting each cam with one of said steering clutches, said cams being arranged to shift but one of said clutches at a time, a brake for each of said clutches, a second pair of cams, and a rocker arm interposed between each of said second cams and its associated brake to effect the applying of such brake following the throwing out of the associated clutch.

8. In a tractor, a pair of steering clutches, brakes for said clutches, means including a shaft to operate said clutches and brakes to steer the tractor, a series of cams for respectively operating said clutches and brakes, means to rotate said shaft in opposite directions, cam levers operatively connecting certain of said cams with said clutches, means to operatively connect certain others of said cams with said brakes including a second shaft arranged substantially parallel with the first mentioned shaft, and cam levers rockably mounted upon said second shaft and having cam followers engaging certain of said cams and operable thereby severally to apply their respective brakes.

9. In a tractor, a pair of steering clutches, brakes to cooperate with said clutches to augment the steering of said tractor, a shaft to operate said clutches and brakes, cams for respectively operating said clutches and brakes, means to rotate said shaft in opposite directions, rocker levers operatively connecting certain of said cams with said clutches, means operatively to connect certain others of said cams with said brakes including a second shaft arranged parallel with the first shaft, rocker levers rockably mounted upon said second shaft and having cam followers engaging certain of said cams and operable thereby to severally apply their respective brakes, and a third shaft arranged parallel with the other shafts, a pedal secured to said third shaft, a cam secured on said third shaft, a lever loosely mounted upon said second shaft provided with a cam follower engaging the last mentioned cam, and clutch means adapted upon the rocking of said loosely mounted lever in one direction to effect the simultaneous operation of said brakes.

In testimony whereof, I have signed my name to this specification.

FREDERICK O. SNOW, Jr.

CERTIFICATE OF CORRECTION.

Patent No. 1,906,428.  May 2, 1933.

FREDERICK O. SNOW, JR.

It is hereby certified that error appears in the printed specification of the above numbered patent requiring correction as follows: Page 2, line 36, strike out the words "substantially in a circle"; page 3, lines 68 and 69, for "an eye 135" read "a lateral arm 135 (See Fig. 5)"; page 4, line 123, for "designate" read "disengage"; page 5, line 40, for "the depressing" read "depression"; line 43, before "shoulders" insert the word "the"; lines 46 and 47, strike out the words "secured to a sleeve 183"; and line 61, for "being" read "is secured to a sleeve 183"; and that the said Letters Patent should be read with these corrections therein that the same may conform to the record of the case in the Patent Office.

Signed and sealed this 30th day of May, A. D. 1933.

M. J. Moore.

(Seal)  Acting Commissioner of Patents.